(12) United States Patent
Davidian et al.

(10) Patent No.: US 9,845,725 B2
(45) Date of Patent: Dec. 19, 2017

(54) ENERGY RECOVERY FROM FUMES FROM A MELTING FURNACE WITH A GAS TURBINE AND HEAT EXCHANGERS

(71) Applicant: L'Air Liquide, Societe Anonyme pour l'Etude et l'Exploitation des Procedes Georges Claude, Paris (FR)

(72) Inventors: Benoit Davidian, Saint Maur des Fosses (FR); Youssef Joumani, Crespieres (FR); Jocelyn Le Dirach, Versailles (FR); Jean-Pierre Tranier, L'Hay-les-Roses (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 187 days.

(21) Appl. No.: 14/654,298

(22) PCT Filed: Dec. 5, 2013

(86) PCT No.: PCT/FR2013/052956
§ 371 (c)(1),
(2) Date: Jun. 19, 2015

(87) PCT Pub. No.: WO2014/096611
PCT Pub. Date: Jun. 26, 2014

(65) Prior Publication Data
US 2015/0345382 A1    Dec. 3, 2015

(30) Foreign Application Priority Data

Dec. 20, 2012 (FR) ..................... 12 62375

(51) Int. Cl.
*F02C 1/05* (2006.01)
*C03B 5/237* (2006.01)
(Continued)

(52) U.S. Cl.
CPC ............. *F02C 1/05* (2013.01); *C03B 5/235* (2013.01); *C03B 5/237* (2013.01); *C03B 5/2353* (2013.01);
(Continued)

(58) Field of Classification Search
CPC ........ Y02P 40/50–40/59; Y02E 20/344; Y02E 20/348; F02C 1/00–1/105; F02C 7/08; F02C 7/10; F02C 7/224
(Continued)

(56) References Cited

U.S. PATENT DOCUMENTS 2,401,285 A * 5/1946 Woodward ............... F02C 1/05
122/DIG. 1
4,030,877 A    6/1977 Robinson
(Continued)

FOREIGN PATENT DOCUMENTS

EP    0 872 690    10/1998
EP    1 338 848    8/2003

OTHER PUBLICATIONS

International Search Report for PCT/FR2013/052956, dated Feb. 24, 2014.

*Primary Examiner* — Laert Dounis
(74) *Attorney, Agent, or Firm* — Christopher J. Cronin

(57) ABSTRACT

The invention relates to a melting unit and method in which: a melting chamber is heated by means of combustion, the combustion fumes are used to heat the air used as a heat-transfer gas, the heated air is used to pre-heat the combustion oxygen and/or the gaseous fuel, the tempered air resulting from the pre-heating is compressed, the compressed tempered air is heated by means of heat exchange with the combustion fumes, and the mechanical and/or electrical energy is generated by expansion of the heated compressed air.

14 Claims, 2 Drawing Sheets

(51) Int. Cl.
*F23L 7/00* (2006.01)
*C03B 5/235* (2006.01)
*F23L 15/04* (2006.01)
*F27D 17/00* (2006.01)
*F27B 17/00* (2006.01)
*F27B 3/10* (2006.01)
*F27D 19/00* (2006.01)

(52) U.S. Cl.
CPC .............. *F23L 7/007* (2013.01); *F23L 15/045* (2013.01); *F27B 3/10* (2013.01); *F27B 17/00* (2013.01); *F27D 17/004* (2013.01); *F27D 19/00* (2013.01); *F23K 2900/01041* (2013.01); *F23L 2900/07005* (2013.01); *F23L 2900/15043* (2013.01); *Y02E 20/344* (2013.01); *Y02E 20/348* (2013.01); *Y02P 40/535* (2015.11); *Y02P 40/55* (2015.11)

(58) Field of Classification Search
USPC .......................................... 60/650, 682, 736
See application file for complete search history.

(56) References Cited

U.S. PATENT DOCUMENTS

| | | | |
|---|---|---|---|
| 4,528,012 A | | 7/1985 | Sturgill |
| 5,006,141 A | * | 4/1991 | Chen ..................... C03B 5/2353 65/134.6 |
| 2003/0010061 A1 | * | 1/2003 | Ha ..................... C01B 13/0248 65/32.5 |
| 2012/0135362 A1 | | 5/2012 | Bioul et al. |

* cited by examiner

ENERGY RECOVERY FROM FUMES FROM A MELTING FURNACE WITH A GAS TURBINE AND HEAT EXCHANGERS

CROSS-REFERENCE TO RELATED APPLICATIONS

This application is a §371 of International PCT Application PCT/FR2013/052956, filed Dec. 5, 2013, which claims §119(a) foreign priority to French patent application 1262375, filed Dec. 20, 2012.

BACKGROUND

Field of the Invention

In a melting furnace, the raw materials are converted into molten material by an application of heat energy which is generally supplied at least in part by combustion. Most of the heat energy generated by the combustion is transferred to the charge (solid raw materials and molten material). However, residual energy is removed from the furnace with the combustion fumes.

Related Art

In the case of an aerocombustion, or air-fuelled combustion melting furnace, it is thus known practice to use alternating countercurrent exchangers made up of ceramics (regenerators) or steel exchangers (recuperators) for preheating the combustion air upstream of the furnace so as to increase not only the efficiency of the combustion in the furnace but also the efficiency of the installation overall insofar as some of the heat energy contained in the removed fumes is recuperated and used as energy for preheating the combustion air.

In a glass furnace with recuperators, the combustion air is preheated to 700° C. whereas regenerators allow combustion air temperatures of 1200° C. or even 1250° C. to be achieved at the start of life of the installation.

The operators of melting furnaces, particularly glassmakers, are increasingly adopting oxycombustion technology, which is both more effective (because it eliminates the thermal ballast of the nitrogen) and less polluting (reducing the NOx and $CO_2$, as it is this same nitrogen that is the origin from which the NOx is formed).

However, the systems for recuperating energy from fumes that have been developed for aerocombustion (regenerators and recuperators) are not well suited to the recuperation of heat energy from the fumes generated by oxycombustion.

EP-A-1338848 describes a system for recuperating energy from the fumes of a glass furnace, particularly an oxycombustion glass furnace. Said system comprises at least one heat exchanger for preheating an oxygen-rich gas and/or a gaseous fuel by exchange of heat with the fumes removed from the furnace, a boiler situated downstream of the at least one heat exchanger and able to generate superheated steam by exchange of heat with the fumes and a steam turbine for expanding the superheated steam to produce mechanical energy.

According to EP-A-1338848, the mechanical energy generated by the turbine can be used to fulfill at least some of the energy requirements of an installation for separating the gases of the air which supplies combustion oxygen for the glass furnace.

In order to produce superheated steam in the boiler at an industrially acceptable efficiency, the fumes at the inlet to the boiler, and therefore also at the outlet of the heat exchanger, need to be at a temperature of at least 1000° C., or even of 1200° C. to 1500° C.

Despite the good ability of the materials identified in EP-A-1338848 to withstand such temperatures, glassmakers prefer to use lower-temperature energy recuperation systems which are considered to be more durable.

Such an alternative system that is particularly reliable at recuperating energy from the fumes of an oxycombustion glass furnace is described in EP-A-0872690.

According to EP-A-0872690, the fumes originating from the oxycombustion furnace are used for the indirect preheating of the oxygen and/or of the fuel upstream of the furnace. In a first heat exchanger, the fumes from the furnace heat an intermediate fluid, such as air for example, by exchange of heat between the two fluids. The heated intermediate fluid from the first exchanger is used in a second heat exchanger to heat combustion oxygen and/or the fuel.

The system for recuperating energy from fumes according to EP-A-0872690 does not, however, allow additional recuperation of energy from the fumes in the form of superheated steam, as is the case in EP-A-1338848, because in practice the fumes at the outlet of the first exchanger are at a temperature markedly below 1000° C.

SUMMARY OF THE INVENTION

It is an objective of the present invention to increase the efficiency with which heat is recuperated from the fumes of a melting furnace using a gaseous fuel and/or oxygen as oxidant and in which the combustion oxygen and/or gaseous fuel are preheated by indirect exchange of heat with the fumes removed from the furnace.

The present invention relates more particularly to a method for melting in a furnace comprising a melting chamber. According to this method, the melting chamber is heated by means of combustion, thus generating heat energy and hot fumes in the melting chamber. The hot fumes are removed from the melting chamber and air, used as heat-transfer gas, is heated by exchange of heat with at least some of the hot fumes removed from the melting chamber, thereby obtaining hot air. At least one reagent chosen from oxygen and/or gaseous fuel is preheated by exchange of heat with the hot air, thereby obtaining at least one preheated reagent and temperate air, and the at least one preheated reagent is used as a combustion reagent for heating the melting chamber. According to the invention, the temperate air, obtained after the preheating of the at least one reagent, is compressed in an air compressor so as to obtain compressed temperate air. This compressed temperate air is then heated by exchange of heat with hot fumes generated by the combustion in the melting chamber so as to obtain heated compressed air with which mechanical and/or electrical energy is generated by expanding this heated compressed air in an expansion turbine.

According to the invention, significant synergy is observed between, on the one hand, the system for recuperating heat energy from the fumes coming from the melting chamber and, on the other hand, the energy recuperated by the expansion turbine. Indeed, an overall efficiency markedly above the energy efficiency that might be predicted for a simple juxtaposition of an expansion turbine with an installation for the recuperation of heat energy by preheating reagents using hot fumes is observed.

It should be noted that combustion is not necessarily the only means of heating the melting chamber and that the furnace may be provided with auxiliary combustion means, such as electrodes.

Advantageously, oxygen is preheated by way of combustion reagent using exchange of heat with the hot air. Gaseous fuel may also be preheated by way of combustion reagent, either alone, or, for preference, in combination with oxygen.

The preheated oxygen may be the only oxidant used for the combustion in the melting chamber. The preheated oxygen may also be used in combination with air as oxidant, typically preheated air.

Thus, the melting furnace may be an oxycombustion furnace (in which the only oxidant is oxygen), an enriched-combustion furnace (using oxygen-enriched air as oxidant), or even a hybrid oxidant furnace (using a combination of combustion using oxygen and a combination of combustion using air, this air potentially being oxygen-enriched).

In this context, the term "oxygen" refers to a gas that has an $O_2$ content of at least 75 vol %, preferably between 80 vol % and 100 vol %, and, more preferably, between 90 vol % and 100 vol %.

Similarly, the preheated gaseous fuel may be the only fuel used for the combustion in the melting chamber or the preheated gaseous fuel may be used in combination with another fuel.

The furnace is preferably an oxycombustion furnace.

Natural gas is a preferred gaseous fuel.

The preheating of at least one combustion reagent by exchange of heat with the hot air is typically performed in a heat exchanger, referred to as primary heat exchanger.

The heating of the air used as heat-transfer gas is similarly typically performed in a second heat exchanger, referred to as secondary heat exchanger.

According to a first embodiment, compressed temperate air is also heated in the secondary heat exchanger by exchange of heat with the hot fumes.

According to an alternative form of embodiment, the compressed temperate air is heated by exchange of heat with hot fumes in a third heat exchanger, referred to as tertiary heat exchanger. The secondary exchanger and the tertiary exchanger may operate in series or in parallel. In the latter instance, the hot fumes are split into several fractions. A first fraction is then introduced into the secondary exchanger for heating the air which is used as heat-transfer gas. A second fraction is introduced into the tertiary exchanger to heat the compressed temperate air upstream of the expansion turbine.

The mechanical and/or electrical energy generated by the expansion turbine may be at least partially supplied to one or more air compressors. The air compressor or compressors are notably chosen from: an air compressor which compresses the temperate air, an air compressor which feeds a unit for separating the gases of the air and another air compressor such as, for example, an air compressor which supplies compressed air by way of heat-transfer gas to the secondary heat exchanger. Specifically, not only is the melting installation equipped with an air compressor often referred to as a blower, for compressing temperate air at the secondary exchanger, but it generally also comprises an air compressor for supplying air before it is used as a heat-transfer gas.

The installation may also comprise a unit for separating the gases of the air and/or other units that are consumers of compressed air supplied by an air compressor. The installation may notably comprise a unit for separating the gases of the air which supplies the combustion oxygen, compressed air cooling installations, etc.

According to one embodiment of the method according to the invention, the expansion turbine supplies between 75% and 100%, preferably 100%, of the energy consumption of the air compressor which feeds the secondary heat exchanger with compressed air.

For preference, the expansion turbine supplies between 25% and 100%, preferably between 50% and 100%, and, in particular, 100%, of the energy consumption of the air compressor which feeds the unit for separating the gases of the air. This unit for separating the gases of the air preferably generates oxygen used as a combustion reagent in the melting method. The unit for separating the gases of the air may notably comprise a distillation column for the cryogenic distillation of the gases of the air.

It is also beneficial to provide a liquid oxygen reservoir as a source of combustion oxygen when the production of combustion oxygen by the unit for separating the gases of the air is shut down or producing less. Such an oxygen reservoir has a storage volume that allows combustion oxygen to be fed to a capacity of the melting chamber for 6 to 8 hours when the unit for separating the gases of the air is shut down. It is also beneficial to provide an auxiliary power source such as a generator for supplying mechanical energy and/or electrical energy that can be used when the expansion turbine is shut down.

The parameters of the method according to the invention are dependent on the material that is to be melted, such as glass, metal, enamel, etc., on size and type of melting chamber, on the throughput of molten material, etc.

The following operating parameters have been identified as advantageous, alone or in combination, notably, although not solely, when the method is a method of melting glass:
  the temperature of the hot fumes removed from the melting chamber is from 1000° C. to 2000° C.,
  the temperature of the oxygen at the outlet of the primary exchanger (preheated oxygen) is of the order of 250° C. to 600° C.,
  the temperature of the gaseous fuel at the outlet of the primary exchanger (preheated fuel) is of the order of 250° C. to 550° C.,
  the temperature of the hot air coming from the secondary exchanger is from 600° C. to 800° C.,
  the temperature of the heated compressed air coming, as the case may be, from the secondary or tertiary exchanger, is from 600° C. to 800° C.,
  the temperature of the temperate air coming from the primary exchanger is from 150° C. to 400° C.

The present invention also relates to a melting installation suited to implementing any one of the embodiments of the method according to the invention.

Thus, the invention relates to a melting installation which comprises a furnace defining a melting chamber heated by combustion. The melting chamber comprises at least one outlet for fumes for evacuating the fumes generated by this combustion.

The installation also comprises a primary heat exchanger for preheating combustion oxygen and/or gaseous fuel upstream of the melting chamber by exchange of heat with air as heat-transfer gas. Said primary exchanger exhibits (a) a (hot) heat-transfer gas inlet and a (temperate) heat-transfer gas outlet and (b) a combustion oxygen inlet (for the combustion oxygen that is to be preheated) and a combustion oxygen outlet (for the preheated combustion oxygen) and/or a gaseous fuel inlet (for gaseous fuel that is to be preheated) and a gaseous fuel outlet (for the preheated gaseous fuel).

The primary exchanger beneficially exhibits an inlet and an outlet for combustion oxygen and preferably also an inlet and an outlet for gaseous fuel.

The melting installation also comprises a secondary heat exchanger for heating air, which is used as heat-transfer gas in the primary exchanger, by exchange of heat with the fumes coming from the melting chamber. Said secondary exchanger exhibits (a) an air inlet (for the heat-transfer fluid that is to be heated) and a compressed air outlet (for the heated compressed air) and (b) a (hot) fumes inlet and a (temperate) fumes outlet.

The fumes inlet of the secondary exchanger is connected to at least one fumes outlet of the melting chamber. The combustion oxygen outlet of the primary exchanger is connected to at least one oxidant injector of the melting chamber. The gaseous fuel outlet of the primary exchanger is connected to at least one fuel injector of the melting chamber.

As a general rule, in the present context, the term "connected" is used in the sense of "fluidically connected", for example using a pipe.

The (temperate) air outlet of the primary heat exchanger is connected to an air inlet of an air compressor, referred to as first air compressor, the first air compressor has a compressed air outlet which is connected to a heat exchanger for heating compressed air in which exchanger the compressed air is heated by exchange of heat with fumes generated by the combustion in the melting chamber. The heat exchanger for heating the compressed air has a heated compressed air outlet which is connected to a compressed gas inlet of an expansion turbine for generating mechanical and/or electrical energy by expanding heated compressed air in this expansion turbine.

According to one preferred embodiment of the installation, the expansion turbine supplies mechanical and/or electrical energy to at least one air compressor. The expansion turbine may notably supply mechanical and/or electrical energy to at least one air compressor chosen from: the first air compressor, an air compressor which feeds a unit for separating the gases of the air and another air compressor, such as an air compressor, referred to as "second compressor" which supplies compressed air to at least one other unit of the compressed air consuming installation. The second compressor may thus be an air compressor which supplies air as heat-transfer gas to the secondary heat exchanger.

When the expansion turbine supplies mechanical energy to at least one air compressor this is advantageously performed by means of a transmission shaft connecting the gas turbine to said air compressor.

When the installation according to the invention comprises a unit for separating the gases of the air, this unit preferably has an oxygen outlet connected to at least one oxidant injector of the melting chamber in order for the separation unit to supply combustion oxygen to said at least one oxyburner. For preference, the oxygen outlet of the unit for separating the gases of the air is, for that purpose, connected to the combustion oxygen inlet of the primary exchanger. The oxygen outlet from the unit for separating the gases of the air is then connected to at least one oxidant injector via the primary exchanger the combustion oxygen outlet of which is connected to said at least one oxidant injector.

As indicated hereinabove, the unit for separating the gases of the air preferably comprises a cryogenic distillation column for the cryogenic distillation of the gases of the air. The unit for separating the gases of the air may also be a system based on the technique referred to as VSA (Vacuum Swing Adsoprtion).

The installation advantageously also comprises an oxygen reservoir by way of source of combustion oxygen when the unit for separating the gases of the air is shut down or producing less. The installation may also beneficially comprise an auxiliary source of mechanical energy and/or of electrical energy, such as a generator, for supplying mechanical energy and/or electrical energy when the expansion turbine is shut down.

As indicated earlier, combustion may be the only means of heating the melting chamber or may be combined with other heating systems such as electrodes.

The (hot) combustion oxygen may be the only oxidant or may be combined with other oxidants, such as air in particular. The gaseous fuel may be the only fuel or may be combined with other fuels.

An oxidant injector connected to the combustion oxygen outlet of the primary exchanger may form part of a burner of the melting chamber. Such an oxygen injector may also form part of an oxidant lance of the melting chamber and in particular of an oxygen lance.

Similarly, a gaseous fuel injector connected to the gaseous fuel outlet of the primary exchanger may form part of a burner of the melting chamber or may be incorporated into a fuel lance of said chamber.

According to one preferred embodiment, the melting furnace is a glass furnace and in particular a glass furnace of the type referred to as a float furnace (namely a furnace with a floating bath, also referred to as a metal bath), although the invention is also of benefit in other melting furnaces, including furnaces for melting metals such as, for example, non-ferrous metals.

Although the above description of the invention is confined to one embodiment whereby air is used as heat-transfer gas, in an alternative form of the invention another gas, such as nitrogen for example, can be used as heat-transfer gas.

The heat-transfer gas may circulate in an open circuit or in a closed circuit. In the latter instance, the gas obtained after expansion in the expansion turbine is reused as a heat-transfer gas in the method/installation. This form of embodiment is particularly recommended when the heat-transfer gas is a gas other than air.

The present invention and advantages thereof are described in further detail hereinafter with reference to FIGS. 1 and 2.

DETAILED DESCRIPTION OF THE INVENTION

Figure 1:
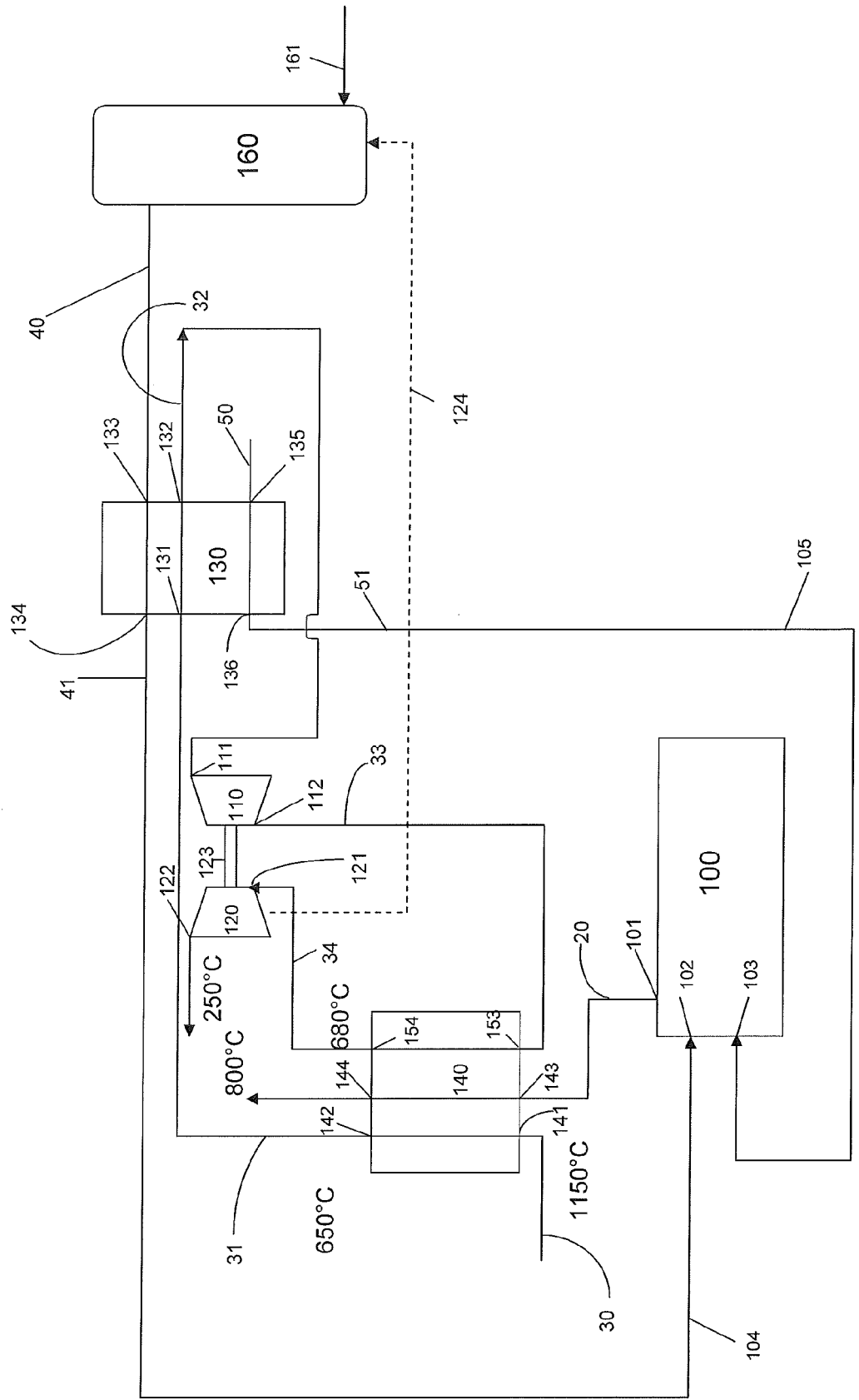
FIGS. 1 and 2 are schematic depictions of two examples of an installation and of a method according to the invention using air as heat-transfer gas.

The melting furnace comprises an oxycombustion melting chamber 100, heated by a number of oxyburners (not depicted). Said burners are fed with fuel, such as natural gas for example, by the pipe 105 and with combustion oxygen by the pipe 104.

The combustion oxygen is generated by a unit for separating the gases of the air 160 which separates compressed air 161 into a stream of oxygen 40 having an $O_2$ content of at least 90 vol %, and a stream (not depicted) consisting chiefly of $N_2$.

The fumes 20 generated by the oxycombustion in the melting chamber 100 are removed from the combustion chamber by the outlet 101, said fumes 20 being at a temperature of between 1000° C. and 2000° C., for example between 1250° C. and 1750° C.

Said hot fumes 20 or at least part 21 of said fumes are conveyed to a first heat exchanger referred to as "secondary heat exchanger" 140. The hot fumes (20, 21) enter the secondary exchanger 140 via a fumes inlet 143 and leave via the fumes outlet 144. Inside the secondary exchanger 140, the fumes heat air 30 by exchange of heat.

The air 30 is introduced into the secondary exchanger 140 via an air inlet 141. The heated air 31 leaves the secondary exchanger 140 via the air outlet 142 at a temperature of between 600° C. and 800° C.

The heated air 31 coming from the secondary exchanger 140 is conveyed to and introduced into a second heat exchanger, referred to as "primary exchanger" 130 via the heat-transfer gas inlet 131.

Just one primary exchanger 130 is depicted in the figures. However, said primary exchanger 130 may be broken down into a series of several primary subexchangers, namely a series of heat-transfer gas/combustion oxygen exchangers and/or of heat-transfer gas/gaseous fuel exchangers.

A stream of oxygen 40 coming from the separation unit 160 is introduced into the primary exchanger 130 via the oxygen inlet 133 and leaves the primary exchanger as preheated oxygen 41 via the oxygen outlet 134. A stream of natural gas 50 is introduced into the primary exchanger 130 via the fuel inlet 135 and leaves the primary exchanger 130 by way of preheated natural gas 51 via the fuel outlet 136.

Inside the primary exchanger 130, the stream of oxygen 40 is preheated to a temperature of between 350° C. and 650° C., for example to 550° C., by exchange of heat with the heated air 31 and the stream of natural gas 50 is preheated to a temperature of between 250° C. and 550° C., for example to 450° C., likewise by exchange of heat with the heated air 31.

The oxygen thus preheated 41 is transported by way of combustion oxygen to the melting chamber 100 by the pipe 104 and the natural gas thus preheated 51 is transported by way of fuel to the melting chamber 100 by the pipe 105.

After it has been used for preheating the oxygen and the gaseous fuel, the temperate heat-transfer gas (air) 32 is removed from the primary exchanger 130 via the air outlet 132.

The temperate air 32 is conveyed to an air compressor 110 in which the temperate air is compressed to a pressure of between 10 and 20 atm, for example to around 15 atm, so as to obtain compressed temperate air 33 at the outlet 112 of the compressor 110.

The compressed temperate air 33 is then conveyed to a heat exchanger to be heated by exchange of heat with hot fumes 20 coming from the melting chamber 100.

In the embodiment illustrated in FIG. 1, the compressed temperate air 33 is thus introduced into the secondary exchanger 140 via the compressed air inlet 153 and the heated compressed air 34 obtained by exchange of heat with the hot fumes 20 is removed from the secondary exchanger 140 by the heated compressed air outlet 154.

Figure 2:
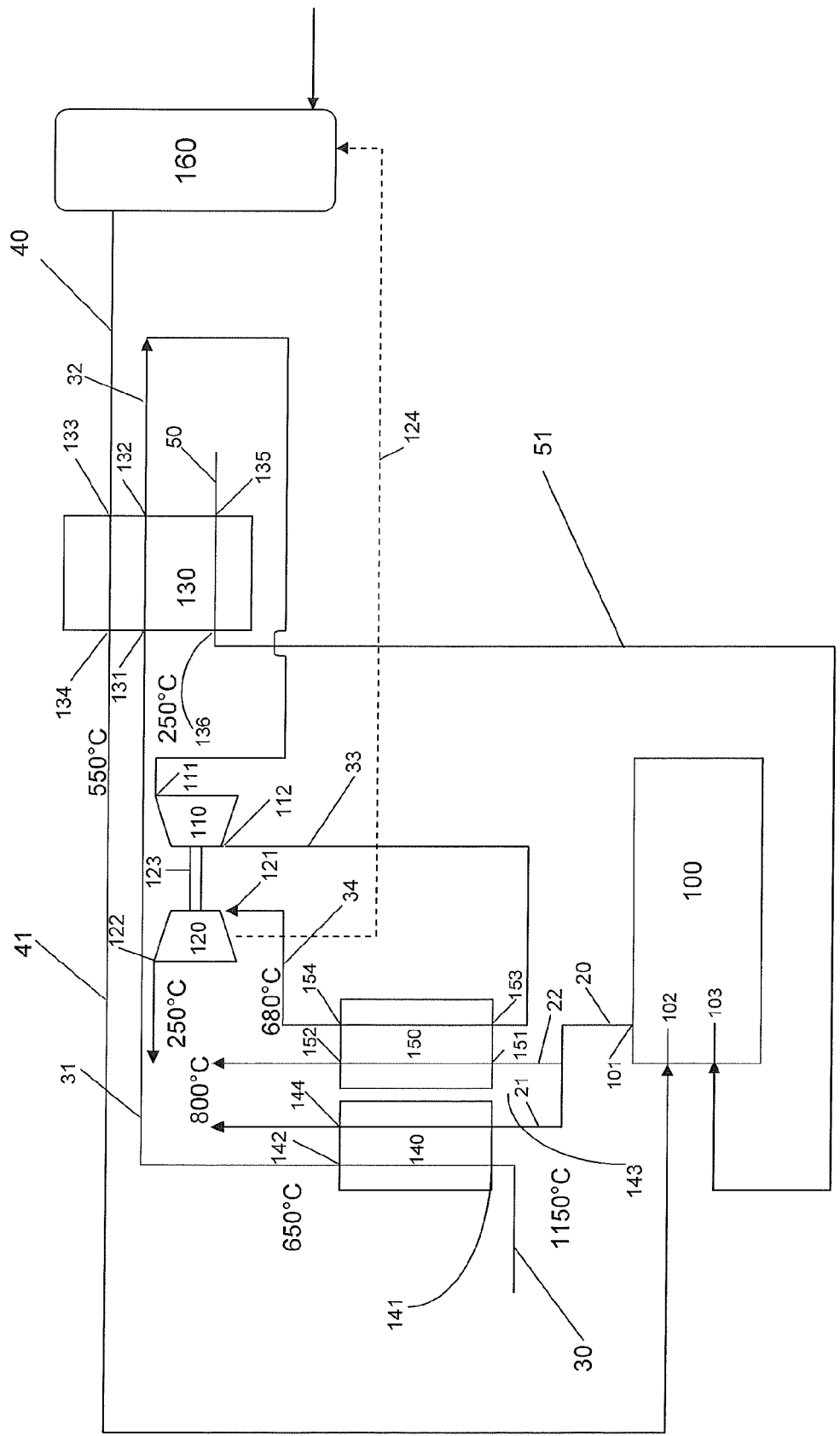

In the embodiment illustrated in FIG. 2, the compressed temperate air 33 is introduced into a third heat exchanger referred to as "tertiary exchanger" 150 by the compressed air inlet 153. The hot fumes 20 are split into two fractions 21 and 22. The fraction 21 of hot fumes is introduced into the secondary exchanger 140 for heating the air 30 which is used as a heat-transfer gas. The fraction of hot fumes 22 is introduced into the tertiary exchanger 150 via the hot fumes inlet 151 for heating the compressed temperate air 33 obtained by compression in the compressor 110 of the temperate air coming from the primary exchanger. The temperate fumes are removed from the tertiary exchanger 150 via the fumes outlet 152 and the heated compressed air is removed via the compressed air outlet 154.

Regulating what fraction of hot fumes 21 is sent to the secondary exchanger 140 and what fraction of hot fumes 22 is sent to the tertiary exchanger 150 on the basis of the heat energy required for respectively heating the air 30 used as heat-transfer gas and heating the compressed air makes it possible to optimize the recuperation and exploitation of the heat energy present in the hot fumes 20 leaving the melting chamber 100.

The heated compressed air 34 is then conveyed to the compressed gas inlet 121 of an expansion turbine 120. The expanding of the heated compressed air 34 in this expansion turbine 120 generates mechanical and electrical energy. After expansion, the air is removed from the expansion turbine via the outlet 122.

In the scenarios illustrated, the energy obtained by this expanding of the heated compressed air is transmitted:
  on the one hand to the air compressor 34 in the form of mechanical energy by the transmission shaft 123, and
  on the other hand, to the separation unit 160 in the form of electrical energy via the connection 124.

EXAMPLE

The present invention and advantages thereof are illustrated in the comparative example below.

The example according to the invention corresponds to the diagram in FIG. 1.

The reference example corresponds to the same diagram except that the temperate air 32 coming from the primary heat exchanger 130 is sent directly to the flue.

The furnace is a glass melting furnace heated by oxy-combustion alone with an oxygen consumption of 7000 Nm$^3$/h and a productivity of approximately 620 t/d of glass.

The electric power consumption of the unit for separating the gases of the air is estimated at 3 MWe.

In the primary exchanger 130, the oxygen is preheated to 550° C. and the natural gas is preheated to 450° C.

In the secondary exchanger 140, the air is heated to 650° C.

In the example according to the invention, the combustion gases leave the combustion chamber 41 at the temperature of 1300° C.

The electrical balance is defined by considering the energy consumption for the compression of air for feeding the separation unit 160, for feeding the secondary exchanger with heat-transfer gas and for compressing temperate air 32 in the compressor 110.

Two scenarios can be envisioned:
  a scenario in which the price of electricity is 40 €/MWh
  a scenario in which the price of electricity is 140 €/MWh
  Table 1 provides the economic data derived from these material and energy balances, for scenario 1.

The permitted investment ratio is calculated on the basis of amortizement over four years with the equipment being available for 8600 hours/year.

TABLE 1

Investment cost calculation (scenario 1)

|  | Reference | Invention |
|---|---|---|
| Electrical balance (kWe) | −2991.0 | −2347.9 |
| OPEX (EUR/h) | 209.37 | 164.35 |
| Additional investment (EUR/kWh) |  | 2408 |

For scenario 2 in which natural gas costs 40€/MWh and electricity 140€/MWh, the economic data are set out in table 2:

TABLE 2

Investment cost calculation (scenario 2)

| | Reference | Invention |
|---|---|---|
| Electrical balance (kWe) | −2991 | |
| OPEX (EUR/h) | 418.74 | 328.71 |
| Additional investment (EUR/kWh) | | 4816 |

For the reference case, an electrical balance of −2991 kWe is observed. According to the invention, the electrical balance is reduced to −2347.9 kWe, which represents a reduction of over 20%. This shows that the invention offers true economic benefit, particularly in regions where the cost of energy is high.

While the invention has been described conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for melting in a furnace comprising a melting chamber, in which method:
   the melting chamber is heated by means of combustion, thus generating heat energy and hot fumes in the melting chamber,
   the hot fumes are removed from the melting chamber and air as heat-transfer gas is heated by exchange of heat with hot fumes removed from the melting chamber, thereby obtaining hot air,
   at least one reagent chosen form oxygen and/or gaseous fuel is preheated by exchange of heat with the hot air, thereby obtaining at least one preheated reagent and temperate air, and the at least one preheated reagent is used as a combustion reagent for heating the melting chamber, characterized in that:
   the temperate air is compressed in a first air compressor so as to obtain compressed temperate air,
   the compressed temperate air is heated by exchange of heat with the hot fumes so as to obtain heated compressed air, and
   mechanical and/or electrical energy is generated by expanding the heated compressed air in an expansion turbine.

2. The method of claim 1, wherein the at least one reagent is preheated by exchange of heat with the hot air in a primary heat exchanger and the heat-transfer gas is heated by exchange of heat with hot fumes removed from the melting chamber in a secondary heat exchanger.

3. The method of claim 2, wherein the compressed temperate air is also heated by exchange of heat with hot fumes removed from the melting chamber in the secondary heat exchanger.

4. The method of claim 2, wherein the compressed temperate air is heated with hot fumes removed from the melting chamber in a tertiary heat exchanger.

5. The method of claim 1, wherein the mechanical and/or electrical energy generated by the expansion turbine is at least partially supplied to one or more air compressors.

6. The method of claim 1, wherein the melting furnace is a glass melting furnace.

7. A melting installation comprising:
   a furnace defining a melting chamber heated by combustion and comprising at least one outlet for fumes generated by combustion,
   a primary heat exchanger for preheating combustion oxygen and/or gaseous fuel upstream of the melting chamber by exchange of heat with air, said primary exchanger exhibiting (a) an inlet and an outlet for heat-transfer gas and (b) an inlet and an outlet for combustion oxygen and/or an inlet and an outlet for gaseous fuel,
   a secondary heat exchanger for heating air by exchange of heat with the fumes coming from the melting chamber, said secondary exchanger exhibiting (a) an inlet and an outlet for air and (b) an inlet and an outlet for fumes, in which installation:
   the fumes inlet of the secondary exchanger is connected to a fumes outlet of the melting chamber,
   the combustion oxygen outlet of the primary exchanger is connected to at least one oxidant injector of the melting chamber and/or the gaseous fuel outlet of the primary exchanger is connected to at least one fuel injector of the melting chamber,
   and characterized in that:
   the air outlet of the primary heat exchanger is connected to an air inlet of a first air compressor, said first air compressor having a compressed air outlet connected to a compressed air inlet of a heat exchanger for heating compressed air by exchange of heat with fumes generated by the combustion in the melting chamber, said heat exchanger having an outlet for heated compressed air, said outlet for heated air being connected to a compressed gas inlet of an expansion turbine for generating mechanical and/or electrical energy by expanding the heated compressed air in the expansion turbine.

8. The installation of claim 7, wherein the secondary heat exchanger is also used as the heat exchanger for heating compressed air.

9. The installation of claim 7, wherein a third heat exchanger, referred to as tertiary heat exchanger, is used as the heat exchanger for heating compressed air.

10. The installation of claim 7, wherein the expansion turbine supplies mechanical and/or electrical energy to at least one air compressor.

11. The installation of claim 10, wherein the expansion turbine supplies mechanical and/or electrical energy to at least one air compressor chosen from: the first air compressor, a second air compressor which feeds a unit for separating the gases of the air and another air compressor.

12. The installation of claim 7, wherein the expansion turbine supplies mechanical or electrical energy to a unit for separating the gases of the air and/or an air compressor of a unit for separating the gases of the air, said unit for separating the gases of the air exhibiting an oxygen outlet connected to the combustion oxygen inlet of the primary exchanger.

13. The installation of claim 7, wherein:
the combustion oxygen outlet of the primary exchanger is connected to at least one oxidant injector incorporated into a burner of the melting chamber and/or the gaseous fuel outlet of the primary exchanger of the primary exchanger is connected to at least one fuel injector incorporated into a burner of the melting chamber;
and/or in which
the combustion oxygen outlet of the primary exchanger is connected to at least one oxidant injector incorporated into an oxidant lance of the melting chamber and/or the gaseous fuel outlet of the primary exchanger is connected to at least one fuel injector incorporated into a fuel lance of the melting chamber.

14. The installation of claim 7, wherein the melting furnace is a glass furnace.

\* \* \* \* \*